United States Patent [19]

Tan et al.

[11] 4,338,342
[45] Jul. 6, 1982

[54] SUCROSE ESTER TREATMENT OF BANANAS

[75] Inventors: Hong S. Tan, Bleiswijk; Dirk A. Smink, Leiderdorp, both of Netherlands

[73] Assignee: Gist-Brocades N.V., Delft, Netherlands

[21] Appl. No.: 71,273

[22] Filed: Aug. 30, 1979

Related U.S. Application Data

[63] Continuation of Ser. No. 852,037, Nov. 11, 1957, abandoned.

[30] Foreign Application Priority Data

Nov. 17, 1976 [GB] United Kingdom ............... 47952/76

[51] Int. Cl.$^3$ ................................................. A23B 7/16
[52] U.S. Cl. ..................................... 426/308; 426/90; 426/102
[58] Field of Search .................. 426/90, 102, 132, 308

[56] References Cited

U.S. PATENT DOCUMENTS

3,471,303 10/1969 Hamdy et al. .................. 426/102 X
3,997,674 12/1976 Ukai et al. .............................. 426/90

FOREIGN PATENT DOCUMENTS

1043777 11/1958 Fed. Rep. of Germany ...... 426/308
48-32344 of 1973 Japan .

OTHER PUBLICATIONS

Kurganskaga et al., "On the Storage of Oranges", Vop. Tekhnol. Proizvol. Obschest. Pitan., (1972), No. 1, pp. 137–140.

*Primary Examiner*—Joseph M. Golian
*Attorney, Agent, or Firm*—Hammond & Littell, Weissenberger and Muserlian

[57] ABSTRACT

A process for the treatment of fruits and vegetables to improve their shelf life and/or to decrease their loss of moisture and the fruits and vegetables treated by such a process and to compositions to be used in the said process wherein fruits and vegetables which are not overripe, i.e., to unripe fruits, to fruits which are just ripe or to partially ripened fruits are treated with an aqueous solution or suspension of sucrose esters of fatty acids.

4 Claims, No Drawings

SUCROSE ESTER TREATMENT OF BANANAS

PRIOR APPLICATION

This application is a continuation of our copending application Ser. No. 852,037 filed Nov. 11, 1957, now abandoned.

STATE OF THE ART

Various proposals have been made to treat fruits and vegetables to prolong their shelf life and/or decrease their moisture but have not been successful. For example, Kurganskaga et al [Vop. Tekhnol. Proizvol. Obschest. Pitan. (1972), No. 1, p. 137–140] reported unsuccessful treatment of oranges with a 0.75% aqueous solution of sucrose stearate and acyl sucrose.

OBJECTS OF THE INVENTION

It is an object of the invention to provide a novel process for treating fruits and vegetables to decrease their moisture loss and to improve their shelf life and to compositions useful in the said process.

It is another object of the invention to provide novel fruits and vegetables that have been treated by the said process.

These and other objects and advantages of the invention will become obvious from the following detailed description.

THE INVENTION

It has surprisingly been found that the shelf life of fruits and vegetables may be extended and the loss of moisture during storage may be decreased by treating them with aqueous solutions, suspensions or emulsions of sucrose esters of fatty acids, preferably derived from natural triglycerides by transesterification of natural triglycerides with sucrose.

The process of the invention comprises treating the fruits or vegetables, for example by immersion, with an aqueous solution, suspension or emulsion of a sucrose ester of a fatty acid, preferably derived from a natural triglyceride by transesterification of the triglyceride with sucrose, and preferably subsequent drying of the fruits or vegetables before storage. The treatment and subsequent drying of e.g. the fruit are preferably effected at or near room temperature. The treated fruits and vegetables have an attractive fresh appearance and do not feel greasy or sweat. A decreased loss of moisture during ripening and/or an extended shelf life were found.

The process of the present invention is for example suitable for the treatment of bananas, the shelf life of which can be extended up to, e.g. 10 days, by immersion in a 2% by weight aqueous solution of a sucrose ester of a fatty acid and subsequent drying at room temperature prior to storage at room temperature. Loss of moisture from the treated fruit was 2.3% compared with a 4.4% loss of moisture from a control sample.

The process of the invention may also be applied to other fruits and vegetables possessing a skin structure which allows the complete coating of the fruits or vegetables, such as plums, lemons, oranges, kiwis, pineapples, grapes, paprikas, aubergines, cucumbers and garlics. A class of fruits and vegetables to which the process of the invention is preferably applied consists of those having a relatively thick peel such as aubergines, lemons, bananas, pineapples, paprikas, cucumbers, garlics, kiwis and oranges.

Sucrose ester mixtures suitable for use in the process of the invention are known and have been used for other purposes such as biologically decomposable emulsifiers in food processing, in the pharmaceutical industry, in cosmetics and in household detergent formulations.

The sucrose esters are known in several formulations and under various brand names. They may be prepared by known methods, for example by the "DMF process" comprising transesterification of a fatty acid ester with sucrose in an inert solvent such as dimethylformamide or propylene glycol in the presence of an alkaline catalyst (e.g. potassium carbonate) under a partial vacuum and at a temperature of about 90° C. Other preparative processes are described in British Pat. Nos. 1,188,614, 1,308,234 and 1,332,190 and in German Offenlegungsschrift Nos. 2,412,374 and 2,546,716.

British Pat. No. 1,188,614 discloses a process for the production of trehalose, raffinose and sucrose esters which comprises heating trehalose, raffinose or sucrose to a temperature between 100° C. and 170° C. with a fatty acid ester which may contain a hydroxy group and 0.5 to 20% by weight of a basic transesterification catalyst (referred to the weight of fatty acid ester employed) until the alcohol that is liberated is distilled off, the heating being carried out under reduced pressure and in the absence of solvents.

British Pat. No. 1,308,234 discloses a process for producing a sucrose ester of a $C_2$ to $C_{22}$ fatty acid which comprises melting and mixing sucrose and a non-saccharide ester of a $C_2$ to $C_{22}$ fatty acid in the presence of, as catalyst, an alkali-free alkali metal soap, and transesterifying the mixture at a temperature from 160° C. to 190° C. The process is preferably carried out at reduced pressure, while the ratio of fatty acid equivalent: moles of sucrose is from 0.5:10 to 8.0:1.0.

British Pat. No. 1,332,190 discloses a process for the preparation of saccharose esters of fatty acids which comprises (a) preparing a solution of completely dissolved saccharose containing a fatty acid soap in water, (b) adding an ester of a fatty acid and a catalyst for effecting transesterification between saccharose and the fatty acid under elevated temperature and a pressure reduced sufficiently to prevent hydrolysis of the fatty acid ester to form an almost completely dehydrated, homogeneous molten composition. The transesterification is effected in the melt at a temperature range of 110°–175° C.

German Offenlegungsschrift No. 2,412,374 discloses the preparation of a surfactant by transesterification of sucrose in the presence of a triglyceride by mixing solid sucrose with the triglyceride in the liquid phase at 110°–140° C. with a basic transesterification catalyst at atmospheric pressure without a solvent.

German Offenlegungsschrift No. 2,546,716 discloses a process for the preparation of surface active compounds starting from a solid granular sucrose which is reacted with at least an alkyl ester of an alcohol having 1-6 carbon atoms in the alkyl residue and having at least 8, preferably 10–22 carbon atoms in the fatty acid residue, in the presence of a basic transesterification catalyst at a temperature of 110° to 140° C. and at normal pressure without any solvent.

It will be appreciated that the process of the present invention is advantageous in that it does not require the application of expensive or toxic chemicals which have to be employed in very precise dosages or the use of semipermeable materials sealed hermetically around the fruits.

The compositions which are used for the treatment of the fruits or vegetables form another feature of the invention and are comprised of a sucrose ester of a fatty acid optionally mixed with residual glycerides and dissolved or suspended (as suspension or emulsion) in water, optionally containing one or more additives, such as antioxidants, stabilizers (e.g. carboxymethylcellulose), preservatives and antibiotics, preferably those acting as fungicides (e.g. natamycin). The sucrose ester content of the final compositions to be used may vary between 0.2-5% and preferably between 0.5-3% by weight for good results. Sucrose esters, consisting largely of the sucrose mono- and di-esters of the natural fatty acids having 12-20 carbon atoms and preferably 16-20 carbon atoms, such as oleic acid, linoleic acid, linolenic acid, palmitic acid, myristic acid, arachidic acid, ricinoleic acid and stearic acid, mixed with the residual mono and diglycerides formed during transesterification of a triglyceride such as palm oil, peanut oil, tallow and coconut oil, with sucrose, and optionally mixed with residual triglycerides, are preferred. Sucrose esters containing relatively large proportions of monoesters, e.g. more than 60% by weight of the total sucrose ester amount, are especially preferred.

A specific example of a sucrose ester mixture suitable for the process of the present invention may have the following characteristics:
melting point of 40°-60° C., preferably 55°-58° C.;
kinematic viscosity in m$^2$/sec.: $13 \times 10^{-5}$ to $30 \times 10^{-5}$,
preferably $17 \times 10^{-5}$ to $21 \times 10^{-5}$ at 98°-99° C.;
density at 66° C.: 965-980 kg/m$^3$, preferably 965-975 kg/m$^3$;
acid index: 4-8, preferably 4-7;
saponification index: 150-170;
and may be characterized by e.g. the following analysis:
combined sugar: 19±1%
free sugar: <1.5%
free acid expressed as:
oleic acid—≦4%
color—≦4EBC.

Preferred actual coating solutions contain 0.5-3% by weight of the sucrose esters, 0.02-2% and more preferably 0.1-1% by weight of the residual monoglycerides, 0.02-2% and more preferably 0.1-1% by weight of the residual diglycerides while the triglyceride content may be 0-2%.

According to a preferred embodiment of the process of the present invention, the sucrose ester-glyceride mixture is suspended in water at 60°-100° C. to obtain a stock suspension of 10-20% by weight concentration of sucrose ester. This suspension is further diluted before use to the desired concentration (0.2-5%) and unripened fruits or vegetables are immersed or drenched in the resulting suspension for 1-5 seconds, and optionally dried in air over 15-60 minutes at room temperature. The process of the present invention may be applied to bananas before as well as after the usual initiation of the ripening process, i.e. treatment with ethylene. While the results of the Tables XIII-XV show that the detected advantageous results certainly cannot be reached for fruits and vegetables in general but only for a specific group of fruits and vegetables having an appropriate skin structure, it will be appreciated that these surprisingly detected advantageous results could not in any way be predicted or expected by skilled people on basis of e.g. the known properties of the sucrose esters used.

In the following examples there are described several preferred embodiments to illustrate the invention. However, it should be understood that the invention is not intended to be limited to the specific embodiments.

EXAMPLE 1

500 g of monosucrose glyceride palmitate having physico-chemical properties within the ranges given above were melted in a container using a water-bath at 100° C. and with vigorous stirring and 4 l of hot water (90° C.) were added. The emulsion formed was made up to 5 l by adding cold water to obtain a 10% weight/volume monosucrose glyceride palmitate stock suspension referred to as P-01.

70 g of pure monosucrose stearate powder was dissolved in 1.1 of water with vigorous stirring to give a stock suspension of 7% weight/volume monosucrose stearate stock suspension referred to as P-02.

In this experiment, green bananas (not treated with ethylene) were used and were immersed during 2-3 seconds in a 0.5% by weight suspension obtained by dilution of the P-01 suspension, and in a 0.7% suspension of monosucrose stearate obtained by dilution of the P-02 suspension. After dipping, the fruits were dried by hanging for not more than 30 minutes on a line and then were put away in boxes as usually used for transportation of bananas, and stored at 14° C. at 90% relative humidity.

After three days, the loss of weight was determined and also the average ripening state by giving the following ratings to each separate hand of the bananas.
0=green
1=more green than yellow
2=more yellow than green
3=yellow
4=yellow with a small number of brown spots
5=yellow with more brown spots
6=yellow with many brown spots
7=nearly or totally brown The results as compared to untreated bananas are summarized in Table I.

TABLE I

| Treatment | Initial weight (g.) | Weight after 3 days (g.) | Loss of weight (g.) | | Average Ripening State | Amount with a ripening state >3 | |
|---|---|---|---|---|---|---|---|
| | | | (g.) | (%) | | (g.) | (%) |
| Controls | 90,553 | 89,782 | 771 | 0.9 | 2.2 | 8647 | 9.6 |
| 5% of P-01 | 47,427 | 47,095 | 332 | 0.7 | 1.5 | 1366 | 2.9 |
| 10% of P-02 | 47,177 | 46,853 | 324 | 0.7 | 2.1 | 4619 | 9.8 |

EXAMPLE II

Green bananas previously treated with ethylene were used and were treated as described in Example I. After storing at room temperature for respectively six and nine days, the loss of weight and the average ripening state were determined. The average ripening state was determined as in Example I. The results are given in Table II.

TABLE II

| Treatment | Initial weight (g.) | After 6 days | | | After 9 days | | | | | | | | | |
|---|---|---|---|---|---|---|---|---|---|---|---|---|---|---|
| | | Loss of weight | | Average ripening state | Loss of weight | | Average ripening state | Amount with a ripening state | | | | | | |
| | | | | | | | | >3 | | >4 | | >5 | | >6 | |
| | | (g.) | (%) | | (g.) | (%) | | (g.) | (%) | (g.) | (%) | (g.) | (%) | (g.) | (%) |
| Controls | 35975 | 990 | 2.8 | 4.3 | 1583 | 4.4 | 5.9 | 34392 | 95.6 | 33729 | 93.8 | 16178 | 45.0 | 15064 | 41.9 |
| 5% of P-01 | 18769 | 374 | 2.0 | 4.1 | 705 | 3.8 | 5.2 | 16972 | 90.4 | 15065 | 80.3 | 8295 | 44.2 | 0 | 0 |
| 10% of P-01 | 19408 | 255 | 1.3 | 2.6 | 535 | 2.8 | 4.6 | 18873 | 97.2 | 10963 | 56.5 | 0 | 0 | 0 | 0 |
| 20% of P-01 | 19175 | 235 | 1.2 | 2.1 | 446 | 2.3 | 3.4 | 6870 | 35.8 | 2298 | 12.0 | 0 | 0 | 0 | 0 |
| 50% of P-01 | 19574 | 214 | 1.1 | 1.8 | 500 | 2.6 | 2.9 | 0 | 0 | 0 | 0 | 0 | 0 | 0 | 0 |
| 20% of P-01 + 0.01% Ascorbic Acid + 0.2% CMC$^x$ | 16925 | 272 | 1.6 | 2.5 | 573 | 3.4 | 3.2 | 9949 | 58.8 | 1035 | 6.1 | 0 | 0 | 0 | 0 |
| 20% of P-01 + 0.01% Ascorbic Acid + 0.5% CMC$^x$ | 17937 | 448 | 2.5 | 2.7 | 870 | 4.9 | 4.2 | 16534 | 92.2 | 3965 | 22.1 | 0 | 0 | 0 | 0 |
| % Myvacet$^{xx}$ | 18423 | 385 | 2.1 | 4.2 | 706 | 3.8 | 6.0 | 17717 | 96.2 | 17717 | 96.2 | 16510 | 89.6 | 1187 | 6.4 |

$^x$CMC = carboxymethylcellulose
$^{xx}$Myvacet 7.00 = 60 g of Acetylated monoglyceride were dissolved in 5 l of ethanol and 1 l of water was then added.

For the Examples III-XIII, as described hereinafter, 10% (weight/volume) stock suspensions of the several coating materials were prepared.

The process was the same as for the preparation of a 10% (weight/volume) stock suspension of monosucrose glyceride palmitate referred to as P-01. Before using in the experiments, each stock suspension was diluted five times with water to obtain a 2% emulsion of the coating material as listed below:

P-03=2% of sorbitan monostearate
P-04=2% of glycerol monostearate
P-05=2% of glycerol mono/di-stearate (1:5 w/w)
P-06=2% of glycerol monocitrate
P-07=2% of sucrose mono/di-stearate/and sucrose mono/dipmitate (about 40% mono-ester and the stearic-palmitinic acid weight ratio being of 7:3)
P-08=2% of sucrose monopalmitate
P-09=2% of sucrose dipalmitate
P-10=2% of sucrosemono/di-stearate/palmitate (about 70% monoester, weight ratio palmitinic/-stearic acid of 3:7)
P-11=2% of sucrose distearate

EXAMPLE III

Green bananas previously treated with ethylene were immersed for 2-3 seconds in P-03, P-05, P-06, P-04 and a five times diluted suspension of P-01. After drying, the fruits were stored at room temperature for 7 days and the loss of weight and the average ripening state were determined. The results given in Table III show that after one week, the average ripening state of the bananas treated with P-01 was strongly retarded in comparison with the control group and also more retarded than those of the groups treated with compositions P-03, P-04, P-05 and P-06. In all cases, the loss of weight was less than that of the controls.

TABLE III

Ethylene treated bananas stored at room temperature for 7 days.

| Treatment | Initial weight (g) | Loss of weight | | Average ripening state |
|---|---|---|---|---|
| | | g | % | |
| Controls | 35,269 | 4,288 | 12.2 | 6.3 |
| P-03, Sorbitan monostearate | 17,917 | 296 | 1.7 | 6.1 |
| P-06, Citric acid monoglyceride | 18,617 | 1,229 | 6.6 | 6.4 |
| P-05, Stearic acid mono/diglyceride (1:5) | 15,479 | 427 | 2.8 | 4.9 |
| P-04, Stearic acid mono glyceride | 15,476 | 1,433 | 9.3 | 5.4 |
| 20% of P-01 | 17,721 | 259 | 1.5 | 3.2 |

EXAMPLE IV

In this experiment, the effect of P-01 and several sucrose esters on the ripening of bananas as studied. Hands of green bananas previously treated with ethylene were split into two parts. One part was dipped into the coating emulsion and the other part was left untreated. Without drying, the treated parts were put away in the boxes together with the corresponding untreated parts. After storage for one week at ambient temperature, the loss of weight and the average ripening state were determined as reported in Table IV.

TABLE IV

| Treatment | | Initial weight (g) | Loss of weight | | Average ripening state |
|---|---|---|---|---|---|
| | | | g | % | |
| P-09, Sucrose dipalmitate | treated | 9,557 | 291 | 3.0 | 5.0 |
| | control | 9,294 | 316 | 3.4 | 6.0 |
| P-08, Sucrose monopalmitate | treated | 10,173 | 436 | 4.3 | 4.5 |
| | control | 9,668 | 453 | 4.7 | 6.1 |
| P-07, Sucrose stearate (~40% mono-ester) | treated | 9,180 | 178 | 1.9 | 3.4 |
| | control | 9,522 | 378 | 4.0 | 6.6 |
| P-10, Sucrose stearate (~70% mono-ester) | treated | 10,469 | 400 | 3.8 | 2.9 |
| | control | 10,290 | 505 | 4.9 | 5.3 |
| P-11, Sucrose distearate | treated | 9,335 | 449 | 4.8 | 5.8 |
| | control | 10,073 | 584 | 5.8 | 6.8 |
| 20% of P-01 | treated | 9,742 | 370 | 3.8 | 3.0 |
| | control | 9,902 | 474 | 4.8 | 6.0 |

As can be seen from Table IV, the shelf life of the treated bananas was better than the untreated ones.

Moreover, the loss of moisture was reduced by the treatment with the coatings.

EXAMPLE V

The experiment of Example IV was repeated except that green bananas which had no previous ethylene treatment were used. After storing at ambient temperature for 11 days, the loss of weight and the average ripening state were determined. The results of Table V were in general the same as in Example IV.

TABLE V

| Treatment | | Initial weight (g) | Loss of weight g | % | Average ripening state |
|---|---|---|---|---|---|
| Sucrose-dipalmitate | treated | 9,316 | 557 | 6.0 | 4.3 |
| P-09 | control | 8,892 | 535 | 6.0 | 4.2 |
| Sucrose-monopalmitate | treated | 9,458 | 533 | 5.6 | 4.1 |
| P-08 | control | 9,006 | 616 | 6.8 | 4.6 |
| Sucrose stearate/palmitate | treated | 9,121 | 324 | 3.6 | 3.0 |
| P-07 | control | 9,232 | 550 | 6.0 | 4.0 |
| Sucrose stearate/palmitate | treated | 9,466 | 273 | 2.9 | 3.4 |
| P-10 | control | 9,257 | 470 | 5.1 | 4.7 |
| Sucrose distearate | treated | 9,140 | 530 | 5.8 | 4.1 |
| P-11 | control | 9,630 | 677 | 7.0 | 4.8 |
| 20% of P-01 | treated | 9,704 | 345 | 3.6 | 1.2 |
|  | control | 9,221 | 398 | 4.3 | 3.0 |

EXAMPLE VI

Hands of green bananas were split into two parts. One part was dipped into a coating suspension of sucrose mono/di-stearate, mono/di-palmitate (P-07) and, without drying, the treated parts were put together with the untreated parts in a box to get an ethylene treatment at 18° C. for 5 days. After storing for one week at ambient conditions, the loss of moisture and the average ripening state were determined. The results of Table VI showed that the coating treatment may be done previous to the ethylene treatment. The experiment was repeated except that a 20% emulsion of P-01 was used instead of P-11. Table VI showed that the result is the same as before.

TABLE VI

| Treatment | | Initial weight (g) | Loss of weight g | % | Average ripening state |
|---|---|---|---|---|---|
| Sucrose mono/di stearate | treated | 9,020 | 556 | 6.2 | 5.6 |
| P-07 | control | 9,335 | 763 | 8.2 | 6.3 |
| 20% of P-01 | treated | 8,702 | 678 | 7.8 | 4.5 |
|  | control | 9,585 | 819 | 8.5 | 5.8 |

EXAMPLE VII

Paprikas were dipped into several sucrose fatty acid ester solutions and after drying, the paprikas were stored at 15° C. for two weeks at a relative humidity of 85%. The results are summarized in Table VII. For each experiment, 10 paprikas were used. No difference in ripening state could be detected between the different groups except that the control group was wrinkled and soft.

TABLE VII

| Treatment | Initial weight (g) | Loss of weight g | % |
|---|---|---|---|
| 20% of P-01 | 1,673 | 201 | 12.0 |
| P-07 | 1,640 | 76 | 4.6 |
| P-11 | 1,656 | 134 | 8.1 |
| P-10 | 1,639 | 80 | 4.9 |
| Control group | 1,678 | 221 | 13.2 |

EXAMPLE VIII

The experiment of Example VII was repeated except that aubergines were used instead of paprikas. After storing for two weeks at 15° C. and 85% relative humidity, the loss of weight and the ripening state were determined as reported in Table VIII. Only the control group was soft and had a wrinkled appearance.

TABLE VIII

| Treatment | Initial weight (g) | Loss of weight g | % |
|---|---|---|---|
| 20% of P-01 | 2,441 | 120 | 4.9 |
| P-07 | 2,500 | 69 | 2.8 |
| P-11 | 2,424 | 136 | 5.6 |
| P-10 | 2,438 | 22 | 0.9 |
| Control | 2,472 | 247 | 10.0 |

EXAMPLE IX

The previous experiment was repeated except that cucumbers were used. After storing for two weeks at 15° C. and 85% relative humidity, the loss of weight and the color of the cucumbers were determined. No difference in color between the treatments could be detected as reported in Table IX.

TABLE IX

| Treatment | Initial weight (g) | Loss of weight g | % |
|---|---|---|---|
| 20% of P-01 | 4,168 | 262 | 6.3 |
| P-07 | 4,073 | 170 | 4.2 |
| P-11 | 4,298 | 214 | 5.0 |
| P-10 | 4,368 | 171 | 3.9 |
| Control | 4,171 | 769 | 18.4 |

EXAMPLE X

In this example, New Zealand Kiwi-fruits were tested and the treatments were performed by dipping in the different coating solutions. After drying, the fruits were stored in boxes at 14° C. and 85% relative humidity for 6 weeks. The results are given in Table X showing that the moisture loss was reduced by the treatments. No difference in ripening state could be observed.

TABLE X

| Treatment | Initial weight (g) | Loss of weight g | % |
|---|---|---|---|
| Control | 3,427 | 122 | 3.6 |
| P-03 | 3,537 | 17 | 0.5 |
| P-06 | 3,487 | 25 | 0.7 |
| 20% of P-01 | 3,493 | 19 | 0.5 |

EXAMPLE XI

Plums were dipped into several sucrose ester coatings and after storing for one week at 15° C. and 85% relative humidity, the loss of weight was determined as reported in Table XI. There was no difference in the ripening state of the different treatments, except that the control group was softer than the other groups.

TABLE XI

| Treatment | Initial weight (g) | Loss of weight g | % |
|---|---|---|---|
| 20% of P-01 | 1,523 | 72 | 4.7 |
| P-11 | 1,515 | 68 | 4.5 |
| P-10 | 1,507 | 49 | 3.3 |
| Control | 1,510 | 333 | 22.0 |

EXAMPLE XII

Fresh garlics were dipped into several coating solutions and after drying, the garlics were stored for four weeks at 4° C. and then the loss of weight was determined. The garlics had black spots caused by fungal attack except for the natamycin treated ones which had a fresh appearance.

TABLE XII

| Treatment | Initial Weight (g) | Loss of weight g | % |
|---|---|---|---|
| Control | 2,816 | 856 | 30.4 |
| P-03 | 2,803 | 397 | 14.2 |
| P-06 | 2,831 | 403 | 14.2 |
| 20% of P-01 | 2,807 | 412 | 14.7 |
| 20% of P-01 + 0.1% of natamycin | 2,814 | 396 | 14.1 |

EXAMPLE XIII

To demonstrate the criticality of the type of vegetable and fruit with a skin structure, the previous experiment was repeated except that onions were used instead of garlics and that no natamycin was used. The results, summarized in Table XIII, showed that after storing at 4° C. for 7 weeks there was no reduced loss of moisture in the treated groups. No difference in freshness and hardness between the control group and the treated ones could be observed.

TABLE XIII

| Treatment | Initial weight (g) | Loss of weight g | % |
|---|---|---|---|
| Control | 13,935 | 316 | 2.3 |
| P-03 | 7,142 | 296 | 4.1 |
| P-06 | 7,217 | 383 | 5.3 |
| 20% of P-01 | 7,148 | 288 | 4.0 |

Similarily, apples were dipped into several coating solutions and after storing for ten weeks at 4° C., the condition of the fruits was determined as reported in Table XIV. This experiment showed that there was no difference in moisture loss between untreated and treated apples. Moreover, there were more fruits with rot and with scald in the coated groups.

TABLE XIV

| Treatment | Initial weight (g) | Loss of weight (g) | % | Fruits with rot (g) | % | Fruits with scald (g) | % | sound fruits % |
|---|---|---|---|---|---|---|---|---|
| Control | 12,668 | 380 | 3.0 | 2,574 | 20.9 | 1,263 | 10.3 | 65.8 |
| 20% of P-01 | 12,499 | 370 | 3.0 | 1,283 | 10.6 | 3,321 | 27.4 | 59.0 |
| 20% of P-01 + 0.02% of CMC + 0.01% of Ascorbylpalmitate | 12,664 | 372 | 3.0 | 2,950 | 24.0 | 2,795 | 22.7 | 50.3 |
| P-03 | 13,770 | 407 | 3.0 | 3,468 | 25.6 | 3,638 | 27.2 | 44.2 |
| P-04 | 13,687 | 381 | 2.8 | 2,720 | 20.4 | 3,089 | 23.2 | 53.6 |

*CMC = carboxymethylcellulose

Also pears were dipped into several coating solutions and after storing for four weeks at 4° C., the condition of the fruits was examined as reported in Table XV.

This experiment showed that with pears only minor differences in the loss of weight between the treated and untreated groups of pears occured. Moreover, the total effect of sound fruits was less in the case of coating with P-01 and better in the two other treatments than the control group.

TABLE XV

| Treatment | Initial weight (g) | Loss of weight (g) | % | Fruits with rot (g) | % | sound fruits % |
|---|---|---|---|---|---|---|
| Control | 17,997 | 354 | 2.0 | 2,606 | 14.8 | 83.2 |
| 20% of P-01 | 17,825 | 302 | 1.7 | 3,204 | 18.3 | 80.0 |
| P-05 | 19,363 | 328 | 1.7 | 2,048 | 10.6 | 87.7 |
| P-06 | 18,290 | 338 | 1.8 | 830 | 4.6 | 93.6 |

Various modifications of the products and processes of the invention may be made without departing from the spirit or scope thereof and it is to be understood that the invention is intended to be limited only as defined in the appended claims.

What we claim is:

1. A process for treating bananas to retard their ripening and to decrease their loss of moisture comprising contacting the bananas with an aqueous solution, suspension or emulsion consisting essentially of 0.2 to 5% by weight of at least one sucrose ester of higher fatty acids of 16 to 20 carbon atoms derived from a natural triglyceride by transesterification of the starting triglyceride with sucrose and mixed with 0.02–2% by weight of residual monoglyceride, 0.02–2% by weight of residual diglycerides and 0–2% by weight of residual triglycerides and optionally drying the fruits and vegetables before storage.

2. The process of claim 1 wherein the sucrose ester mixtures are mixed with at least one member of the group consisting of antioxidants, stabilizers, preservatives and antibiotics.

3. The process of claim 2 wherein natamycin is mixed with the sucrose ester mixture.

4. The process of claim 1 wherein the sucrose esters are of an acid selected from the group consisting of palmitic acid, stearic acid, oleic acid, linoleic acid, linolenic acid, myristic acid, arachidic acid and ricinoleicad acid and mixed with mono, di and triglycerides containing these acids.

* * * * *

UNITED STATES PATENT AND TRADEMARK OFFICE
CERTIFICATE OF CORRECTION

PATENT NO. : 4,338,342
DATED : July 6, 1982
INVENTOR(S) : HONG S. TAN and DIRK A. SMINK It is certified that error appears in the above-identified patent and that said Letters Patent are hereby corrected as shown below:

| Col. | Line | |
|---|---|---|
| [63] | Title Page | "Nov. 11, 1957" should be --Nov. 16, 1977-- |
| 1 | 6 | "Nov. 11, 1957" should be --Nov. 16, 1977-- |
| 3 | 44 | " " should be -- -- |
| 3 | 45 | SAME AS ABOVE |
| 5 | 16 | "$CMC^x$" should be --CMCx-- |
| 5 | 20 | "$Myvacet^{xx}$" should be --Myvacetxx-- |
| 10 | 15 | "CMC +" should be --$CMC^*$+-- |

Signed and Sealed this

Nineteenth Day of April 1983

[SEAL]

Attest:

Attesting Officer

GERALD J. MOSSINGHOFF

Commissioner of Patents and Trademarks